M. SZYMKIEWICZ.
UTENSIL.
APPLICATION FILED JULY 28, 1921.
1,419,423.
Patented June 13, 1922.
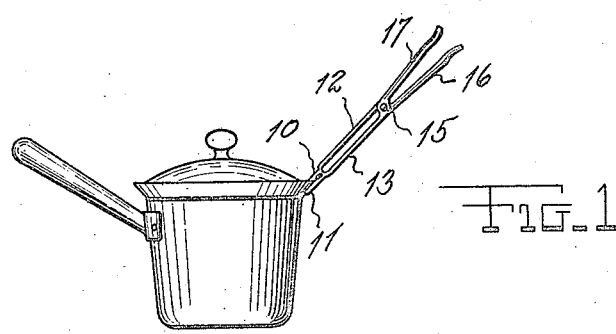
Fig. 1
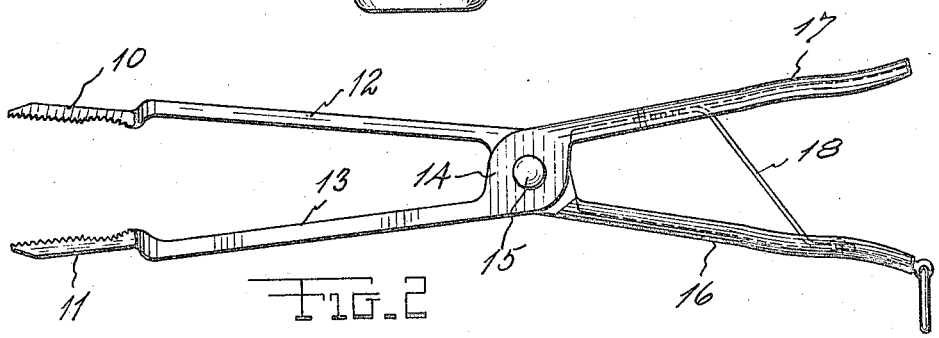
Fig. 2
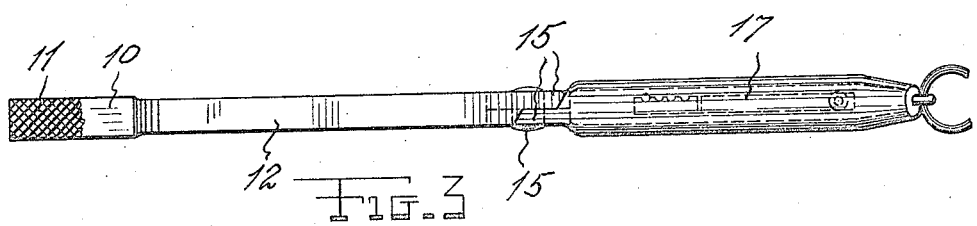
Fig. 3
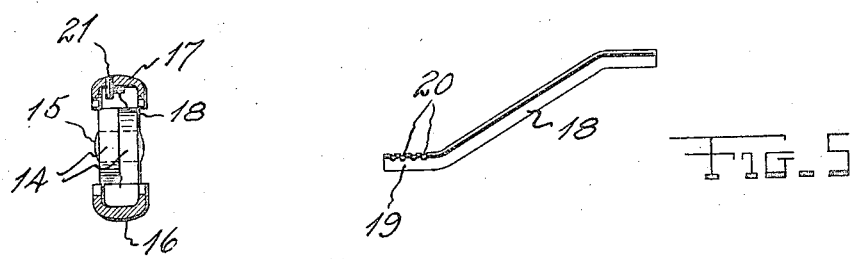
Fig. 4
Fig. 5
INVENTOR
Maciej Szymkiewicz
BY
ATTORNEY

UNITED STATES PATENT OFFICE.

MACIEJ SZYMKIEWICZ, OF JERSEY CITY, NEW JERSEY.

UTENSIL.

1,419,423. Specification of Letters Patent. Patented June 13, 1922.

Application filed July 28, 1921. Serial No. 488,142.

*To all whom it may concern:*

Be it known that I, MACIEJ SZYMKIEWICZ, a citizen of the United States, residing at Jersey City, in the county of Hudson and State of New Jersey, have invented certain new and useful Improvements in Utensils, of which the following is a specification.

This invention relates to improvements in pot lifters and has for its principal object to provide a device for aiding in the handling of hot vessels.

Another object of the invention is to provide an implement having a pair of gripping jaws which are yieldably held in open position by a leaf spring which is so designed as to provide a locking means for holding the jaws in closed position.

With these and other objects in view the invention consists in the novel construction, combination and arrangement of parts which will be fully set forth in the following specification, claimed and illustrated in the accompanying drawing, in which,—

Figure 1 is a side view of a vessel showing this improved pot lifter in use,

Figure 2 is a side view showing the pot lifter in open position,

Figure 3 is an edge view of Figure 2,

Figure 4 is a transverse sectional view through the handle portions of the device, and Figure 5 is a perspective view of the spring.

Referring to the drawings in detail, the numerals 10 and 11 designate a pair of cooperating jaw members which are arranged at the outer ends of levers 12 and 13 respectively. These levers are each provided with barrels 14 which are apertured to receive a pivot pin 15. Formed on the barrel members 14 of the levers 12 and 13 respectively are handle members 16 and 17 respectively and it will thus be seen that as the handles are moved toward each other the jaw members will close.

As shown in Figure 4 the handles are transversely U shaped and riveted to the bight portion of the handle member 16, between its side flanges is a leaf spring 18, the free end of which is disposed against the bight portion of the handle 17 between its flanges. An angular extension 19 is formed on the free end of the spring 18 and is provided in one of its side edges with a series of notches 20 for the reception of the pin 21 which is riveted in the handle 17 and cooperates with the walls of said notches in holding the jaws in various adjusted positions.

In operation it will be seen that when pressure is applied to the handles, the jaw members will be moved toward each other so as to grip opposite sides of the edge of a vessel. Obviously as the handles are moved toward each other the extension 19 will slide along the inner side of the bight portion of the handle 17 so that the pin will engage in one of said notches 20 and hold the handles against separation.

While in the foregoing there has been shown and described the preferred embodiment of this invention, it is to be understood that certain minor changes, in the details of construction, combination and arrangement of parts may be resorted to without departing from the spirit and scope of the invention as claimed.

What is claimed is:—

1. A device of the class described comprising, a pair of levers pivoted together at one end, jaw members at the opposite end of each lever, handles for closing the jaw members, spring means for urging the jaw members apart and means associated therewith for holding the jaw members closed.

2. A device of the class described comprising, a pair of jaw members, handles for closing the jaw members, spring means for urging the jaw members into open position, said spring means having notches therein, and means adapted to enter the notches to hold the jaw members closed.

3. A device of the class described comprising, a pair of levers, jaws at the free ends of the levers, barrels at the opposite ends of the levers, a pin pivotally connecting the barrels, handles extending from the barrels from the sides opposite the levers, a leaf spring riveted to one of the handles, a notched extension on the free end of the spring, and a pin on the opposite handle for engagement in the notches to hold the jaws closed.

In witness whereof I affix my signature.

MACIEJ SZYMKIEWICZ.